United States Patent
Bonicel

[11] Patent Number: 6,151,434
[45] Date of Patent: Nov. 21, 2000

[54] SEALED TUBE CABLE CONTAINING AT LEAST ONE OPTICAL CONDUCTOR

[75] Inventor: Jean Pierre Bonicel, Rueil Malmaison, France

[73] Assignee: Alcatel, Paris, France

[21] Appl. No.: 09/090,160

[22] Filed: Jun. 4, 1998

[30] Foreign Application Priority Data

Jun. 5, 1997 [FR] France .................................. 97 06964

[51] Int. Cl.⁷ ...................................................... G02B 6/44
[52] U.S. Cl. ........................... 385/102; 385/103; 385/100; 385/101; 385/104; 385/105; 385/106; 385/113
[58] Field of Search ..................................... 385/102, 103, 385/100, 101, 104, 105, 106, 113

[56] References Cited

U.S. PATENT DOCUMENTS

| | | | |
|---|---|---|---|
| 4,232,935 | 11/1980 | Rohner et al. | 385/111 |
| 4,688,889 | 8/1987 | Pasini et al. | 385/128 |
| 5,636,551 | 6/1997 | Davidson et al. | 74/502.5 |

FOREIGN PATENT DOCUMENTS

| | | |
|---|---|---|
| 01 57 516A2 | 10/1985 | European Pat. Off. . |
| 2404236 | 4/1979 | France . |
| 21 72 410 | 9/1986 | United Kingdom . |

OTHER PUBLICATIONS

Patent Abstracts of Japan, vol. 005, No. 096 (P–067), Jun. 23, 1981 corresponding to JP 56 039503 A (Kokusai Denshin Denwa Co Ltd) Apr. 15, 1981.

*Primary Examiner*—Mohammad Y. Sikder
*Attorney, Agent, or Firm*—Sughrue, Mion, Zinn, Macpeak & Seas, PLLC

[57] ABSTRACT

A cable comprises a leakproof tube containing at least one optical fiber together with a filler material which holds the fiber(s) in place inside the tube and which provides the tube with longitudinal sealing. The filling ratio of the fiber-holding material is less than a determined limit so as to provide at least one expansion volume inside the tube so that the partial pressure of hydrogen remains low enough to avoid giving rise to significant attenuation in the transmission properties of the optical fiber.

9 Claims, 1 Drawing Sheet

SEALED TUBE CABLE CONTAINING AT LEAST ONE OPTICAL CONDUCTOR

BACKGROUND OF THE INVENTION

Optical conductors are commonly employed in the field of telecommunications. Information in light form is generally conveyed at a wavelength of about 1300 nm or of about 1550 nm via silica-based optical fibers. Each fiber is protected by layers of polymer material, and the protective layers are usually covered in another polymer that is pigmented.

A set of optical fibers can be assembled together to form a tape. Under such circumstances, the tape material is also a polymer.

The optical fibers, whether individual or in a tape, are placed inside a tube made of metal or of plastics material.

It is known that optical fibers must not be exposed to hydrogen since that gas spoils their transmission properties. The extent of spoilage increases with increasing hydrogen partial pressure to which the fiber is subjected.

For example, when the partial pressure exerted by hydrogen is one atmosphere, then the attenuation of the fiber increases by about 6 dB/km at a wavelength of 1240 nm. At 1240 nm, this attenuation is substantially proportional to the partial pressure of hydrogen.

It may be observed at this point that although the fibers are used at a wavelength of 1300 nm or of 1550 nm, variation in attenuation is often measured at a wavelength of 1240 nm, since that is the wavelength at which fiber presents its greatest sensitivity to hydrogen.

Hydrogen can be produced, in particular, by decomposition of the polymers constituting the fiber coatings or the material for assembling the fibers together in the form of a tape. Hydrogen can also come from the decomposition of the filler material that is generally provided in a tube in order to hold the fibers inside the tube and impede ingress of moisture in the event of the tube being broken or damaged.

The decomposition mentioned above occurs naturally because of aging.

When the tube is made of plastics material, then the porosity of the material allows the hydrogen to escape. However, when the tube is made of metal, the hydrogen remains confined inside the tube and the fibers are therefore progressively degraded.

Until now, two solutions have been proposed for remedying this drawback.

The first solution consists in providing a material that absorbs hydrogen. That solution is expensive.

The second solution consists in avoiding the use of a filler material in the tube. Under such circumstances, the cable is not protected against ingress of water into the tube and the fibers can also be subjected to vibration. In addition, the fibers can move inside the tube and that can lead to damage.

OBJECTS AND SUMMARY OF THE INVENTION

The invention remedies those drawbacks.

In the invention, the filling ratio of the material filling the tube, preventing the optical fibers from moving, and providing longitudinal leakproofing for the tube, is limited so as to leave at least one expansion volume for hydrogen, thereby limiting its partial pressure.

By way of example, the filling ratio can be 95% at most.

The filling ratio can be determined experimentally, e.g. by selecting a filling ratio that ensures that the partial pressure of hydrogen does not exceed about 0.02 atmospheres; preferably, the partial pressure of hydrogen is prevented from exceeding about 0.01 atmospheres. The ratio can also be determined by measuring the increase in attenuation at the wavelength of 1240 nm; under such circumstances, a filling ratio is selected so that the increase does not exceed 0.05 dB/km.

In an embodiment, the tube is filled partially by periodically leaving gaps in the longitudinal direction of the tube, which gaps do not contain any filler material. To obtain filling with periodic gaps, the filler material is injected in intermittent manner during manufacture.

In a second embodiment, the filler material is continuous along the length on the tube, but it occupies only a fraction of the section of the tube. To manufacture such a cable, the delivery rate from the pump injecting filler material is substantially lower than the rate required for achieving complete filling.

In another embodiment, pores are provided in the filler material, e.g. by injecting an inert gas such as nitrogen simultaneously with injection of the filler material. In a variant, the material is injected in the form of an emulsion, e.g. with the filler material being stirred prior to injection so that it contains captive bubbles of air.

The lower limit for the filling ratio depends above all on the properties of the filler material, and in particular on its thixotropic properties.

BRIEF DESCRIPTION OF THE DRAWING

Other characteristics and advantages of the invention appear from the following description of various embodiments given with reference to the accompanying drawing, in which.

MORE DETAILED DESCRIPTION

Figure 1:
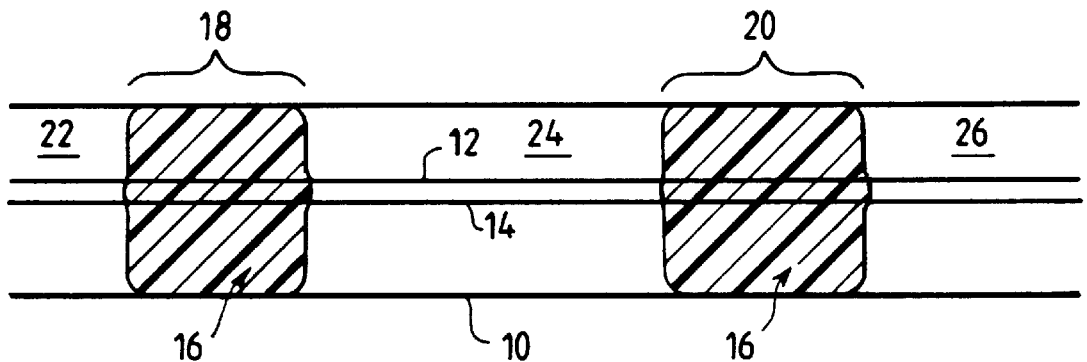
FIG. 1 is a diagrammatic longitudinal section view of a tube cable of the invention.

In the example shown in FIG. 1, the cable comprises a metal tube 10 designed to contain in sealed manner optical fibers 12, 14, etc. . . . , together with a filler material 16 for holding the fibers in a determined position inside the tube 10 and also for preventing water penetrating along the tube in the event of the tube being punctured at a particular location. By way of example, the material 16 may be a grease.

The optical fibers are coated in polymer material. Similarly the grease 16 is also polymer based. It is known that polymer materials decompose during aging and that they give off hydrogen.

The invention seeks to put a limit on the partial pressure of hydrogen inside the tube 10 which is sealed.

In the longitudinal direction, the tube is subdivided into lengths that are alternately full of grease 16 and empty of grease 16. In FIG. 1 it can thus be seen that the grease 16 occupies segments 18 and 20 which are spaced apart between segments or gaps 22, 24, and 26 that have no grease.

The filling ratio, i.e. the ratio of volume occupied by the grease 16 and the fibers 12, 14, compared with the total inside volume of the tube, must be low enough to ensure that hydrogen, in particular the hydrogen that results from aging of the grease 16 and of the coating on the fibers, remains below a partial pressure at which the increase in fiber attenuation at 1240 nm reaches 0.05 dB/km.

The value of the filling ratio can be determined experimentally by adjusting it so that the partial pressure of hydrogen does not exceed about 0.01 atmospheres. More generally, the partial pressure of hydrogen can rise to about 0.02 atmospheres before the consequences on fiber attenuation become prejudicial to transmission quality.

The increase in attenuation and in hydrogen partial pressure are measured after aging that has been accelerated by heating to 85° C. for a period of seven days.

The maximum filling ratio that is acceptable with these constraints is variable. It depends on the nature of the materials constituting the fiber coatings and the grease. It also depends on the nature of the metal of the tube, and in particular on its level of leakproofing against hydrogen leakage which can vary. Thus, heavy metals are more porous than light metals.

The maximum filling ratio is usually about 95%.

The minimum filling ratio depends on the mechanical properties of the filler material 16, and specifically on its thixotropic properties.

It is necessary for the material 16 to have properties enabling it to hold the fibers; it is also necessary for the material to have viscosity enabling the fibers to move radially inside the tube during manufacture and use of the cable.

By way of non-limiting example, in the example shown in FIG. 1, the minimum filling ratio is of the order of 5%.

To manufacture the tube shown in FIG. 1, the grease 16 is injected using ordinary equipment (not shown) but instead of injecting continuously, the equipment is made to operate intermittently.

Figure 2:
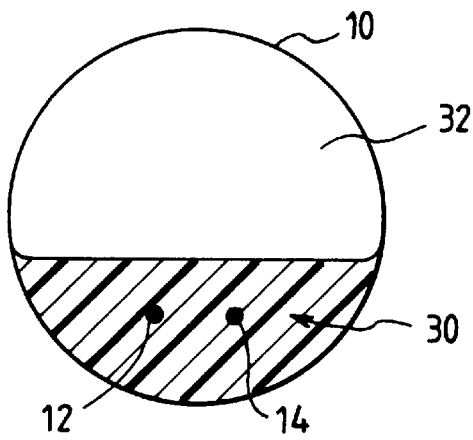
FIG. 2 is a cross-section view of a tube cable in one variant.

In the variant shown in FIG. 2, the filler material 30 is continuous over the entire length of the tube 10. However the filler material occupies only a fraction of the section of the tube 10. In other words, in cross-section, the tube 10 has an empty portion 32. It should be observed that under such circumstances, the optical fibers 12 and 14 are naturally to be found in the filler material and not in the empty portion 32.

To manufacture such a tube, conventional grease injection equipment is also used, with the filling ratio being obtained by selecting injection at a rate that is sufficiently low. More precisely, the filling ratio is proportional to the injection rate.

Figure 3:
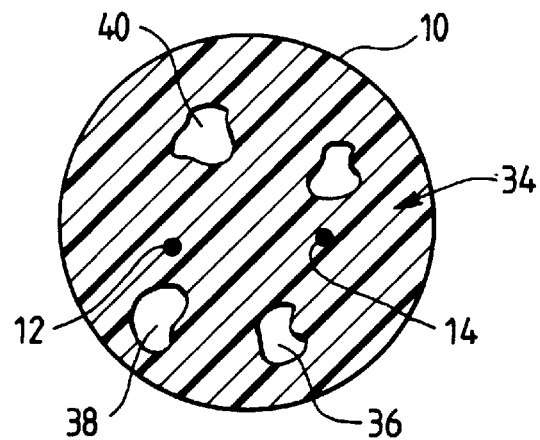
FIG. 3 is another cross-section view of a tube cable in another variant.

In the example shown in FIG. 3, the filler material 34 has pores 36, 38, 40, etc. These pores are filled with an inert gas such as nitrogen or air.

To manufacture the tube shown in FIG. 3, in one implementation, inert gas is injected simultaneously with the filler material 34.

It is also possible to combine gas injection with a prior emulsifying step.

In another example, the filler material 34 is emulsified prior to injection.

In the examples described with reference to FIGS. 2 and 3, as in the example described with reference to FIG. 1, the filling ratio must be sufficient for the material 16 to perform its function of holding the fibers in place. In particular, it must prevent or restrict longitudinal displacement and vibration thereof. However, in particular during manufacture, it must be possible for the fiber(s) to move in the grease.

The invention provides a particularly simple and low cost solution for opposing the effects of hydrogen being given off in leakproof tubes. It makes it possible to avoid using a material for trapping hydrogen, where such material is generally expensive, while simultaneously ensuring that the fibers are held appropriately inside the tube.

The invention is applicable regardless of the number of optical fibers (or tapes) contained in the tube.

What is claimed is:

1. A cable comprising a leakproof tube containing at least one optical fiber and a filler material which holds the fiber(s) in place inside the tube and which provides longitudinal sealing for the tube, wherein the filling ratio of the fiber-holding material is less than a limit that is determined in such a manner as to leave at least one expansion volume inside the tube so that the partial pressure of hydrogen is low enough to avoid giving rise to significant attenuation in the transmission of properties of the optical fiber(s); and wherein the filling ratio is such that the increase in attenuation of a fiber does not exceed about 0.05 dB/km after accelerated aging, e.g. at 85° C. for seven days, said increase in attenuation being measured at about 1300 nm, 1550 nm, or 1240 nm.

2. A cable according to claim 1, wherein the filling ratio is about 95% at most.

3. A cable according to claim 1, wherein the filling ratio is such that the partial pressure of hydrogen does not exceed about 0.02 atmospheres, and preferably about 0.01 atmospheres.

4. A cable according to claim 1, wherein the fiber-holding material is disposed in segments along the tube, with filled segments being separated by segments having no such material.

5. A cable according to claim 1, wherein the fiber-holding material is disposed continuously along the tube and occupies only a fraction of the section of the tube.

6. A cable according to claim 1, wherein the fiber-holding material is porous.

7. A cable according to claim 6, wherein the pores contain an inert gas, e.g. nitrogen or air.

8. A cable according to claim 1, wherein the tube is made of metal.

9. The cable according to claim 5, wherein the fiber-holding material is disposed continuously along the tube by injecting the fiber-holding material into the tube at a delivery rate which is less than a delivery rate required to achieve complete filling of the section of the tube.

* * * * *